US012810509B2

(12) United States Patent
Zhang

(10) Patent No.: US 12,810,509 B2
(45) Date of Patent: Nov. 24, 2026

(54) STRETCHING ISOMETRIC IMAGES

(71) Applicant: ATI Technologies ULC, Markham (CA)

(72) Inventor: Bokun Zhang, Markham (CA)

(73) Assignee: ATI Technologies ULC, Markham (CA)

( * ) Notice: Subject to any disclaimer, the term of this patent is extended or adjusted under 35 U.S.C. 154(b) by 140 days.

(21) Appl. No.: 19/000,997

(22) Filed: Dec. 24, 2024

(65) Prior Publication Data

US 2026/0179279 A1 Jun. 25, 2026

(51) Int. Cl.
*G06T 11/60* (2026.01)
*G06T 7/13* (2017.01)

(52) U.S. Cl.
CPC ................ *G06T 11/60* (2013.01); *G06T 7/13* (2017.01)

(58) Field of Classification Search
CPC ........................................................ G06T 11/60
See application file for complete search history.

(56) References Cited

U.S. PATENT DOCUMENTS

2013/0190087 A1* 7/2013 Somarajapuram ...... A63F 13/10 463/32
2018/0174352 A1* 6/2018 Kang ...................... G06T 15/04

OTHER PUBLICATIONS

Keys, R. (1981) 'Cubic convolution interpolation for digital image processing', IEEE Transactions on Acoustics, Speech, and Signal Processing, 29(6), pp. 1153-1160. doi:10.1109/tassp.1981.1163711 (Year: 1981).*
Cubic convolution interpolation (Year: 1981).*
Zhang, Lvmin et al. "Adding Conditional Control to Text-to-Image Diffusion Models." 2023 IEEE/CVF International Conference on Computer Vision (ICCV) (2023): 3813-3824.
Liu, Yixin et al."Sora: A Review on Background, Technology, Limitations, and Opportunities of Large Vision Models." ArXivA abs/2402.17177 (2024).
Qin, Xuebin et al. "U2-Net: Going Deeper with Nested U-Structure for Salient Object Detection." Pattern Recognit.106 (2020): 107404.

* cited by examiner

*Primary Examiner* — Shivang I Patel
(74) *Attorney, Agent, or Firm* — Patterson + Sheridan, LLP

(57) ABSTRACT

Embodiments herein identify anchor points in an isometric image (e.g., bottom, left, right, and top anchor points) which can be used to adjust the image so it has a desired perspective (e.g., where the angles between the x, y, and z axes are the same). To do so, a system determines horizontal adjustments for the anchor points using polynomial interpolation. The system then determines vertical adjustments for the anchor points using cubic polynomial interpolation. Doing so adjusts or stretches the image so that it has the desired orientation. In this manner, isometric images (e.g., AI-generated images) that each have a different orientation can be separately adjusted to have the same orientation so they, for example, each can be placed in grids with the same dimensions for an isometric game.

20 Claims, 5 Drawing Sheets

STRETCHING ISOMETRIC IMAGES

TECHNICAL FIELD

Examples of the present disclosure generally relate to adjusting (e.g., stretching) isometric images that have different orientations to have the same orientation.

BACKGROUND

Isometric video game graphics use projection techniques to give the gamer a three-dimensional (3D) effect, even though the game sprites are all two-dimensional (2D) images. This type of game is easier to create since the developer does not need to build complex 3D models and texture maps. Additionally, the game engine does not need to be coded to handle 3D rendering. One important aspect of creating game sprites for such games is that the art developer needs to create these sprites with the same isometric orientation. With the rapid development of artificial intelligence (AI)-generated images from, for example, stable diffusion algorithms, even a developer without an art background can create such a game from scratch.

SUMMARY

One embodiment described herein is a computing system that includes one or more processors and one or more computer-readable storage media, and one or more computer-readable storage media storing program instructions to cause the one or more processors to perform operations. The operations include identifying right, left, bottom, and top anchor points in an isometric image; adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

One embodiment described herein is a non-transitory computer readable medium comprising instructions which, when executed by a processor in a computing system, performs operations. The operations include identifying right, left, bottom, and top anchor points in an isometric image; adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

One embodiment described herein is a method that includes identifying right, left, bottom, and top anchor points in an isometric image; adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
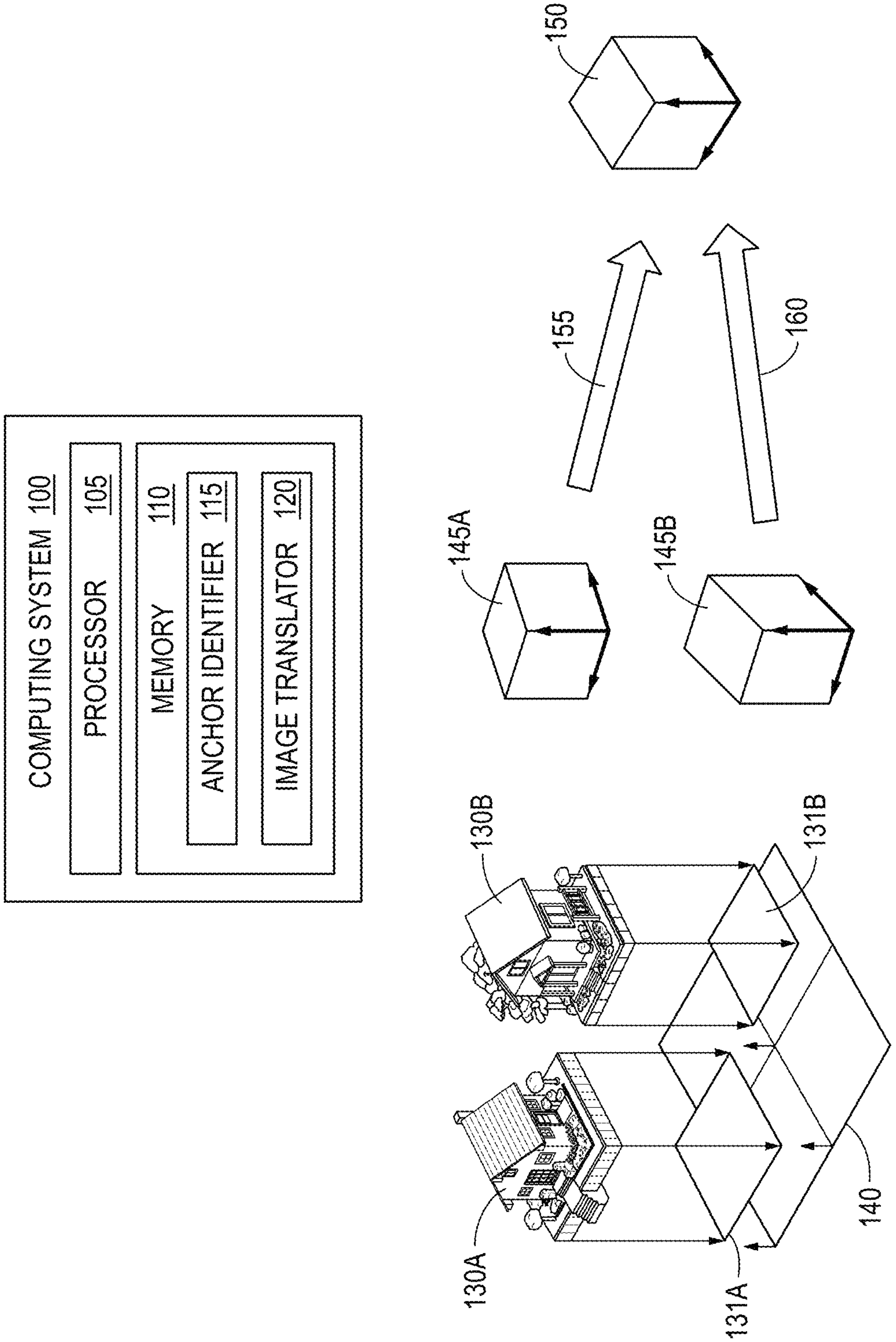
FIG. 1 illustrates a computing system for adjusting isometric images to have the same orientation, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

While AI can be used to generate sprites for isometric games, the AI-generated sprites often lack logical coherence and are not aligned to the same isometric view. Therefore, these assets cannot be combined seamlessly, and each asset must be manually adjusted, which reduces the usefulness of AI image generation. The embodiments below describe how to generate game assets for isometric video game graphics and propose a set of image processing algorithms to align the generated images to a unified isometric orientation.

Embodiments herein identify anchor points in an isometric image (e.g., bottom, left, right, and top anchor points) which can be used to adjust the image so it has a desired perspective (e.g., where the angles between the x, y, and z axes are the same). To do so, a system determines horizontal adjustments for the anchor points using polynomial interpolation. The system then determines vertical adjustments for the anchor points using cubic polynomial interpolation. Moving the anchor points in this two-step process adjusts or stretches the image so that it has the desired orientation. In this manner, isometric images (e.g., AI-generated images) that each have a different orientation can be separately adjusted to have the same orientation so they each can be placed in grids with the same dimensions for an isometric game.

FIG. 1 illustrates a computing system 100 for adjusting isometric images 130 to have the same orientation, according to an example. The computing system 100 includes a processor 105 which represents any number of processing elements (e.g., one or more central processing unit (CPUs), graphical processing units (GPUs), hardware accelerators, application specific integrated circuits (ASICs), etc.). The processor 105 can include any number of processing cores.

The computing system 100 also includes memory 110 which can be volatile memory, non-volatile memory, and combinations thereof. The memory 110 includes an anchor identifier 115 and an image translator 120, which can be two different software applications or two modules in the same software application.

The anchor identifier 115 can identify anchor points in an isometric image, such as the isometric images 130. In one embodiment, the anchor identifier 115 identifies four anchor points at a bottommost point/pixel of the image, the leftmost point/pixel of the image, the rightmost point/pixel of the image, and a top of the image (which might not be the topmost pixel of the image). The details for identifying the anchor points will be discussed below in FIG. 6. Further, while the anchor identifier 115 can be used to identify anchor points, the embodiments herein can also be used when a human identifies the anchor points. As such, the anchor points can be programmatically identified using the embodiments described herein, or by a human.

The image translator 120 uses the anchor points to manipulate the image so it has a desired orientation. This can be performed on a plurality of isometric images so they have the same orientation. This is discussed in detail in FIG. 2.

To illustrate the problem when isometric images do not have the same orientation, FIG. 1 illustrates isometric images 130A and 130B. Isometric image 130A has an orientation that matches one of the blocks in a grid 140. FIG. 1 illustrates a projection 131A of the image 130A that shows its base dimension matches the dimension of the underlying block in the grid 140.

The grid 140 can be a layout used for an isometric game where each block can be occupied by an isometric image (e.g., a sprite). While a block may be the smallest area a sprite can occupy, a sprite can occupy multiple blocks (e.g., 2×2 or 3×3 area of the grid 140). Nonetheless, the isometric images can have the same orientation.

The isometric image 130B, in contrast, does not have the same orientation as the isometric image 130A. As such, a projection 131B of the image 130B onto the grid 140 illustrates that the base dimensions of the isometric image 130B do not match the dimensions of the underlying block in the grid 140. As such, if the isometric image 130B was placed on the grid 140 with its current dimensions, it would not directly abut the sprites in the neighboring blocks, or would overlap with the neighboring sprites which has a sever negative impact on the aesthetics of the grid 140.

An illustration of the function of the image translator 120 is illustrated by the isometric image orientations 145A and 145B. For example, the orientations 145A and 145B can correspond to AI-generated images that have different orientations. As such, before these images can be used in the grid 140 of an isometric game, the image translator 120 adjusts, manipulates, or stretches the images so they have the desired orientation which matches the blocks in the grid 140.

Figure 2:
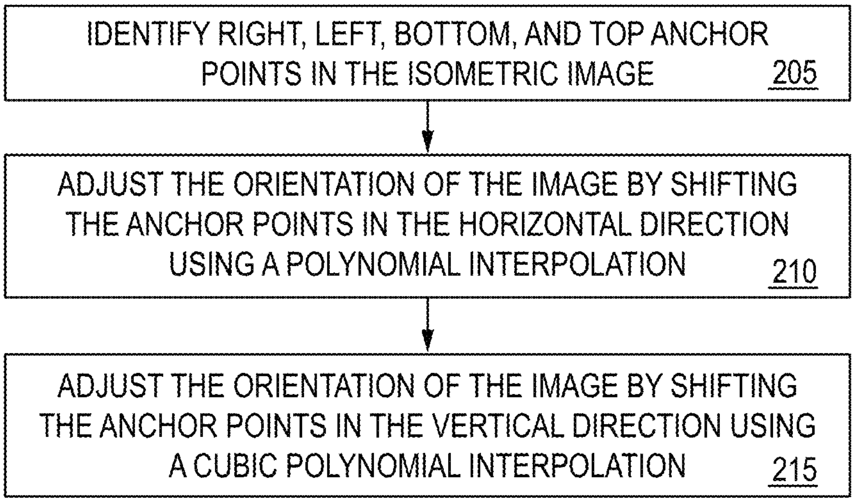
FIG. 2 is a flowchart for adjusting isometric images to have the same orientation, according to one embodiment.

The arrows 155 and 160 in FIG. 1 illustrate the process described in FIG. 2 by which the image translator 120 manipulates the orientations 145A and 145B so that the corresponding images both have the desired image orientation 150. With these images now having the desired image orientation 150, they can be used as sprites and placed within the blocks of the grid 140 (i.e., they will have a projection like the projection 131A which matches the dimensions of the blocks in the grid 140).

FIG. 2 is a flowchart of a method 200 for adjusting isometric images to have the same orientation. In one embodiment, the method 200 can be performed independently (or separately) on a plurality of isometric images, which can be created by AI (e.g., stable diffusion algorithms) or by a human artist.

At block 205, the anchor identifier identifies right, left, bottom, and top anchor points in an isometric image. In one embodiment, the anchor identifier is provided the anchor points by a human. For example, a human can use an input device to indicate the locations (pixels) of the anchor points in the image. However, in another embodiment, the anchor identifier can detect the anchor points without human input. This is described in FIG. 6. The method 200 can be used regardless of the manner in which the anchor points were selected.

Figure 3:
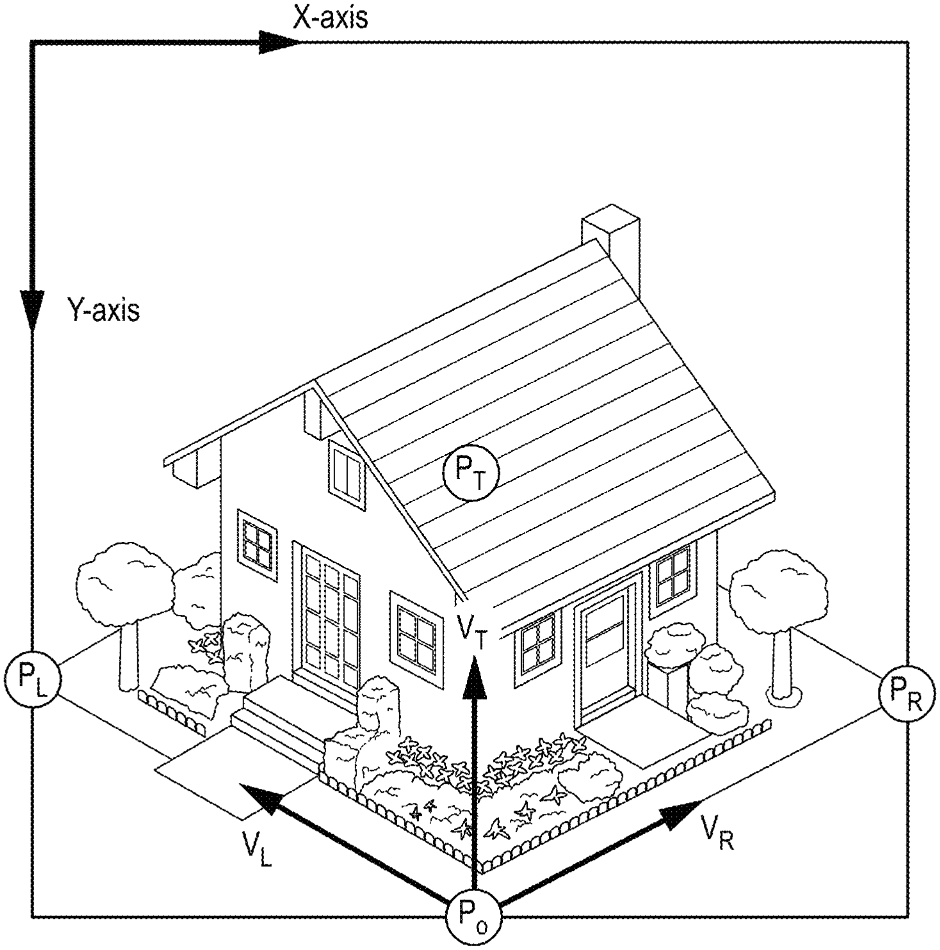
FIG. 3 illustrates an isometric image with anchor points, according to an example.

FIG. 3 illustrates an isometric image 300 with anchor points, according to an example. The image 300 has four anchor points where the left point is labeled $P_L$, the right point is labeled $P_R$, the bottom point is labeled $P_O$, and the top point is labeled $P_T$. The image 300 also illustrates the 3D axes $V_L$, $V_R$, and $V_T$ which define the orientation of the image 300. The image 300 also illustrates the 2D coordinates for the image 300. That is, the image 300 is actually a 2D image as defined by pixels arranged on the x and y axes, but appears as a 3D image along the 3D axes $V_L$, $V_R$, and $V_T$. Thus, the image 300 illustrates an exemplary isometric image that can include four anchor points which are used in the remaining steps in the method 200 to change its orientation to a desired orientation (also referred to as a unified isometric view).

Before transforming the image, the anchor identifier establishes a coordinate system. Since many AI image generation algorithms can handle 512×512 pixel images, this coordinate system will be used in the examples below, but the embodiments herein can apply to any image resolution.

The anchor identifier assigns the top-left pixel the integer coordinate index (0, 0), and the bottom-right pixel is (511, 511). As shown in FIG. 3, the horizontal direction is labeled as the X-axis, pointing to the right, and the vertical direction is labeled as the Y-axis, pointing downward.

An isometric view base is also established which is different from the image's X-Y coordinate, and it can contain real numbers instead of integers. It includes three base vectors ($V_T$, $V_R$, $V_L$) and an origin point $P_O$, as shown in FIG. 3, where $V_T, V_R, V_L, P_O \in \mathbb{R}^2$.

The base vectors and the origin is organized into a matrix B. For a perfect isometric view of a 512 by 512 image, the matrix B should have the following values:

$$B = \begin{bmatrix} V_t^T \\ V_r^T \\ V_l^T \\ P_o^T \end{bmatrix} = \begin{bmatrix} 0 & -1 \\ 0.866 & -0.498 \\ -0.866 & -0.498 \\ 256 & 511 \end{bmatrix} \quad (1)$$

However, instead of using the base-origin matrix in Equation 1, it is easier to use anchor points. In one embodiment, the anchor points are the corner points of an isometric image's bottom projection. Then, a linear transformation can be used to convert between the base-origin matrix and the anchor matrix. The perfect isometric anchor matrix A is presented below:

$$A = \begin{bmatrix} P_t^T \\ P_r^T \\ P_l^T \\ P_o^T \end{bmatrix} = \begin{bmatrix} 256 & 216 \\ 511 & 364 \\ 0 & 364 \\ 256 & 511 \end{bmatrix} \tag{2}$$

The embodiments herein align isometric images to a perfect base. Without loss of generality, by modifying the base vectors in B, the images can be aligned to different isometric views.

While the matrix B represents a perfect isometric view where the angles between the axes forming the 3D isometric view are equal, the techniques herein can be applied to other desired orientations of the images, in which case the values of the B matrix would change to represent those values.

The following discussion will refer to the anchor points as $q_i$, which can correspond to the points $P_L$, $P_R$, $P_O$, and $P_T$ in FIG. 3 which are the corner points of the bottom projection of the image 300.

A transformation T of an image is defined as a 2D map, T: $\mathbb{R}^2 \rightarrow \mathbb{R}^2$. More specifically, the transformation can be expressed as:

$$T(x, y) = (x', y') = (T_x(x, y), T_y(x, y)) \tag{3}$$

where $T_x$ and $T_y$: $\mathbb{R}^2 \rightarrow \mathbb{R}$. T maps a pair of pixel index coordinates to a new pair of coordinates. It is important to preserve the vertical relationship. More specifically:

$$T_x(x, y) = T_x(x, y + dy) \tag{4}$$

which leads to:

$$\frac{\partial T_x}{\partial y} = 0 \tag{5}$$

Equation 5 simplifies the overall transformation to:

$$T(x, y) = (x', y') = (T_x(x), T_y(x, y)) \tag{6}$$

Since X-axis shearing tilts the up-direction of the image, the new image will appear distorted without the constraint in Equation 5. Another way to interpret this constraint is that every pixel in a column of the image should be mapped to the same new column. This constraint essentially renders affine transformation unusable. Additionally, a continuous map is preferred to preserve the image quality. Since the constrained transformation in Equation 6 contains two parts, Tx(x) and Ty(x, y) (where the y component in the $T_x$ function in Equation 6 has been removed relative to Equation 3), these two parts of the transform in Equation 6 can be performed separately.

Returning to the method 200, at block 210 the image translator adjusts the orientation of the image by shifting the anchor points in the horizontal direction using a polynomial interpolation. That is, the first part of the transformation in Equation 6 (i.e., Tx(x)) is performed at block 210 using polynomial interpretation.

Figure 4:
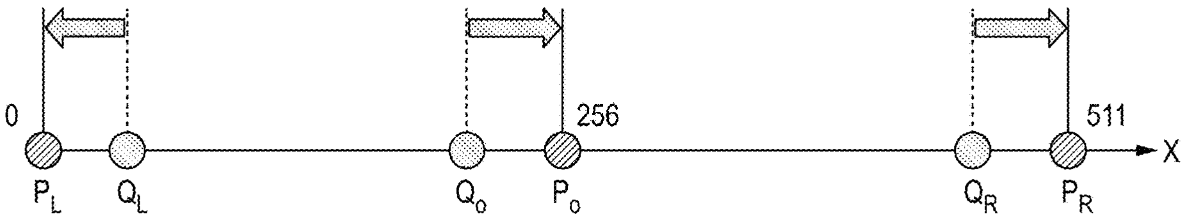
FIG. 4 illustrates shifting anchor points in a horizontal direction, according to one embodiment.

Since Tx(x) is only related to X-coordinates, the following discussion refers to FIG. 4 which illustrates an example of horizontal locations of the four anchor points $Q_L$, $Q_R$, $Q_O$, and $Q_T$ projected onto the X-axis. The actual Q point locations may vary depending on the anchor placement. The points $P_L$, $P_R$, $P_O$, and $P_T$ are the perfect isometric view anchors (i.e., the desired x-axis locations of the anchor points) and $Q_L$, $Q_R$, $Q_O$, and $Q_T$ are the current locations of anchor points of the generated image. In one embodiment, for Tx(x), the anchor point $Q_T$ is not used. The goal is to define a smooth transformation that maps the anchor points Q to the perfect view anchors P. Therefore, the image translator can use a quadratic interpolation such as:

$$T_x(x) = \frac{(x - x_{q_o})(x - x_{q_r})}{(x_{q_l} - x_{q_o})(x_{q_l} - x_{q_r})} x_{p_l} + \frac{(x - x_{q_l})(x - x_{q_r})}{(x_{q_o} - x_{q_l})(x_{q_o} - x_{q_r})} x_{p_o} + \frac{(x - x_{q_l})(x - x_{q_o})}{(x_{q_r} - x_{q_l})(x_{q_r} - x_{q_o})} x_{p_r} \tag{7}$$

where $x_{p_i}$ and $x_{q_i}$ are the X-axis values of $p_i$ and $q_i$. The discussion below will use poly_fit(x, $\{a_i\}$, $\{b_i\}$) to represent the polynomial interpolation formula that maps data series $\{a_i\}$ to data series $\{b_i\}$. This can be expressed as:

$$T_x(x) = \text{poly\_fit}(x, \{x_{q_l}, x_{q_o}, x_{q_r}\}, \{x_{p_l}, x_{p_o}, x_{p_r}\}) \tag{8}$$

The Equation 8 can then be used to adjust the anchor points in the horizontal direction. Adjusting the anchor points then adjusts the rest of image by stretching, compressing, or otherwise manipulating the image to change the orientation of the image.

Figure 5:
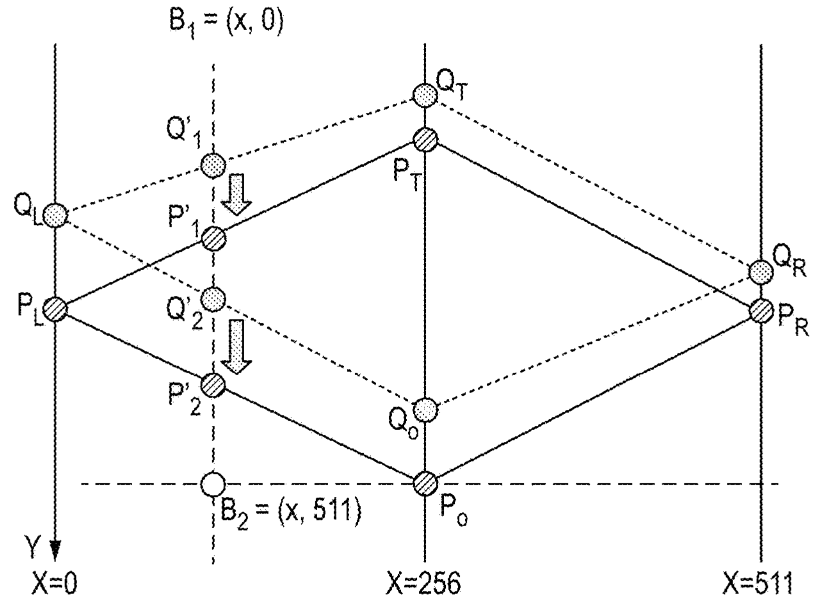
FIG. 5 illustrates shifting anchor points in a vertical direction, according to one embodiment.

FIG. 5 illustrates the results of applying the polynomial interpolation formula in the horizontal direction and then applying a vertical adjustment. That is, FIG. 5 illustrates the geometry between $p_i$ and $q_i$ for Ty after applying Tx.

At block 215, the image translator adjusts the orientation of the image by shifting the anchor points in the vertical direction using a cubic polynomial interpolation. After applying Tx, the same concept can be used to define Ty, but include $q_t$ and adapt the Y-axis values, which results in a more complicated formula. In one embodiment, the image translator generates image intermediate points $$p_i' \text{ and } q_i'$$

and two boundary points B to be used to perform block 215. For example, FIG. 5 illustrates intermediate points $Q'_1$ between the pair of anchor points $Q_L$ and $Q_T$, $Q'_2$ between the pair of anchor points $Q_L$ and $Q_O$, $P'_1$ between the desired anchor points $P_L$ and $P_T$, and $P'_2$ between the desired anchor points $P_L$ and $P_O$. FIG. 5 also illustrates boundary points $B_1$ and $B_2$. From FIG. 5, the following equations can be deduced:

$$p_1'(x) = \frac{1}{256}((256 - x)p_l + xp_t) \tag{9.1}$$

-continued $$p_2'(x) = \frac{1}{256}((256 - x)p_l + xp_o) \tag{10.1}$$

where the intermediate points vary with the X-axis value. Note that Equations 9 and 10 define a piece-wise continuous function that is not smooth. In one embodiment, the left anchor point is swapped with the right anchor point when x>256, and we will apply below formula:

$$p_1'(x) = \frac{1}{255}((x - 256)p_r + (511 - x)p_t) \tag{9.2}$$

$$p_2'(x) = \frac{1}{255}((x - 256)p_r + (511 - x)p_o) \tag{10.2}$$

Similar formulas as Equations 9 and 10 can be found for intermediate points $q_i'$.

A cubic polynomial interpolation can be used to map the Y-axis values using the intermediate points. Note that 511 is the Y-axis value of the boundary point $b_2$:

$$T_y(x, y) = \text{poly\_fit}(y, \{0, y_{q'1}(x), y_{q'2}(x), 511\}, \{0, y_{p'1}(x), y_{p'2}(x), 511\}) \tag{11}$$

where $y_{p'1}(x)$ represents the Y-axis value of $$p_i'(x),$$

and similarly for $y_{q'1}(x)$. One reason for adding the boundary points is to ensure that the image around the boundary of the image remains stationary to preserve image quality, avoiding an unaesthetic distortion effect.

Changing the y-values of the anchor points according to Equation 11 manipulates, or stretches the images so they have the desired orientation which matches the blocks in the grid.

Also, in one embodiment, numerical instability in Equation 11 can be prevented. In Equation 11, when x=0 and x=511, it will cause a division by zero issue since $$p_1' = p_2' = p \text{ and } q_1' = q_2' = q.$$

Therefore, a small value is added in the denominator of the polynomial interpolation formula. In addition, the boundary point $b_2$ can lead to an extreme sharp slope in the cubic polynomial at x=256 because it overlaps with $p_o$. As such, the Y-axis value of $b_2$ can be increased by an addition, e.g., 20% to 641.1 to achieve better image quality.

Figure 6:
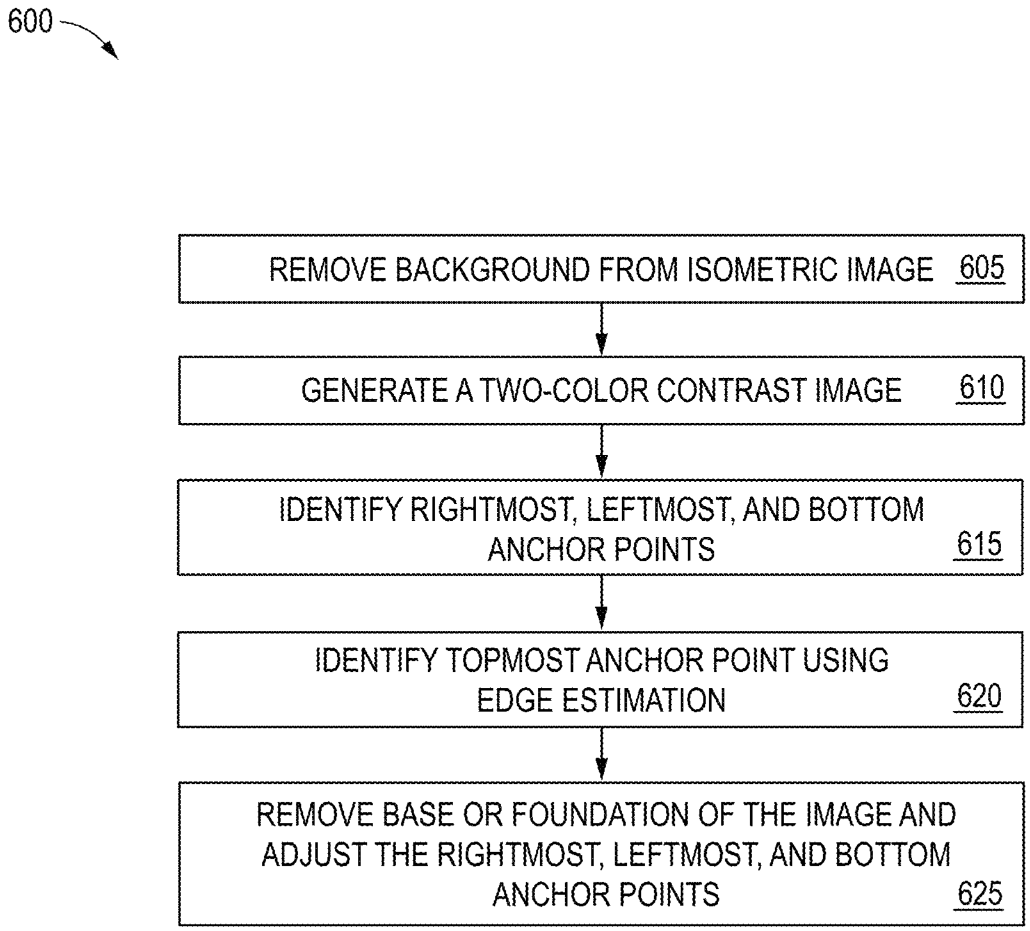
FIG. 6 is a flowchart for automatically identifying anchor points in an isometric image, according to one embodiment.

FIG. 6 is a flowchart of a method 600 for automatically identifying anchor points in an isometric image, according to one embodiment. The method 600 is one example of an automatic technique to identify anchor points in an image, without human interaction. That is, the method 600 is one example of performing block 205 of FIG. 2 to identify anchor points in an isometric image.

At block 605, the anchor identifier removes any background from an isometric image. For example, AI generated images often contain non-white backgrounds, which can be masked out. Any suitable technique can be used to identify and remove the background image (where U2-Net is one suitable example). In addition to removing backgrounds, the images may include shadows, which are also removed at block 605.

Figures 7A, 7B, 7C, 7D, 7E, 7F:
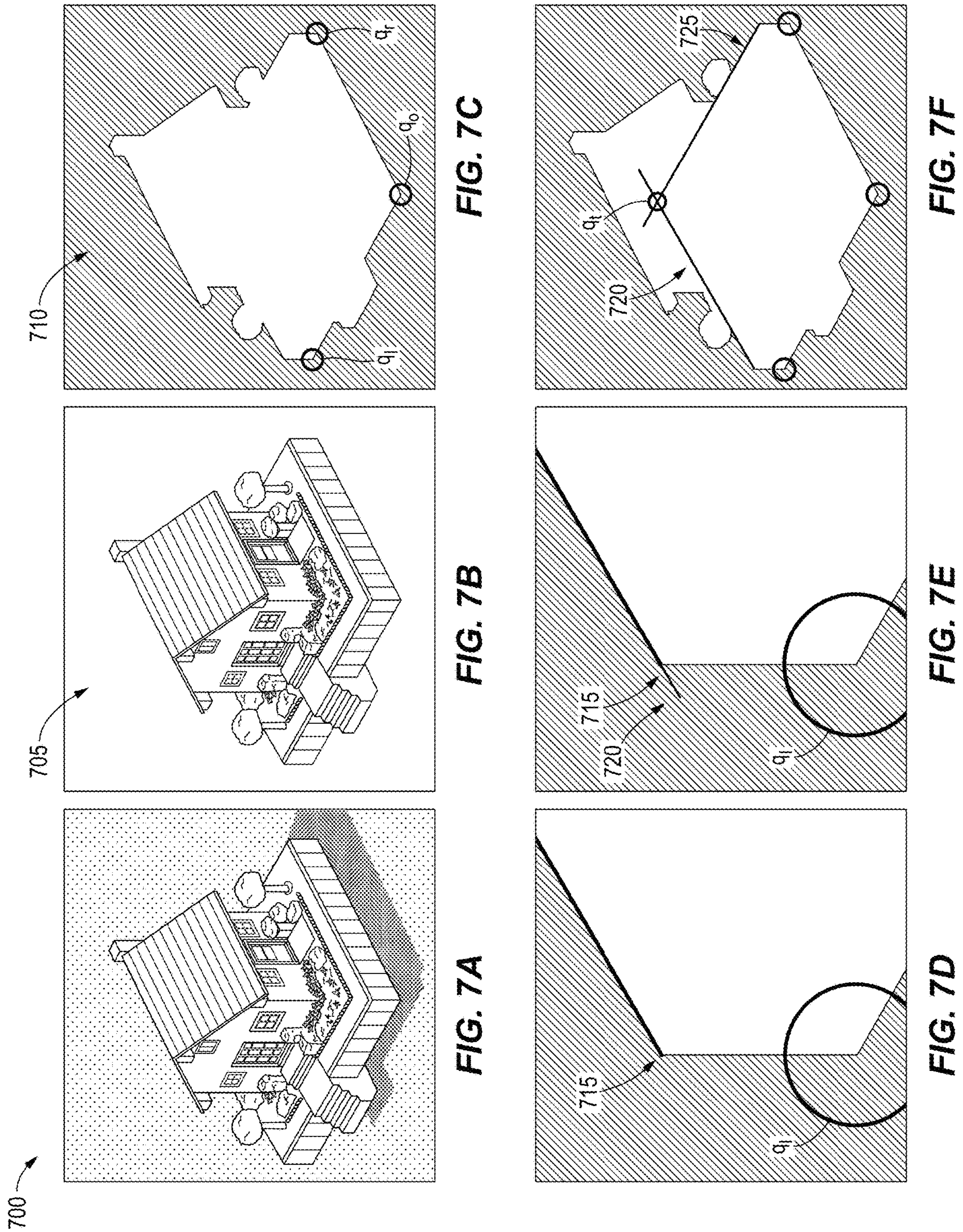
FIGS. 7A-7F illustrate processing an isometric image to identify anchor points, according to one embodiment.

FIG. 7A illustrates an example isometric image 700, while FIG. 7B illustrates the same isometric image 705 but with the background being removed.

Returning to the method 600, at block 610 the anchor identifier generates a two-color contrast image. It may be easier for the software to identify anchor points in a two-color contrast image 710 as shown in FIG. 7C where the background is a different color (e.g., black) than the rest of the image (e.g., white). This two-color contrast is shown using a hashing in FIG. 7C.

At block 615, the anchor identifier identifies rightmost, leftmost, and bottom anchor points using the two-color contrast image which, as discussed above can be located at the projection of the image. This can be done by searching for the furthest points in each direction, except for the top. FIG. 7C illustrates identifying the left anchor point $q_l$, the bottom anchor point $q_o$, and the right anchor point $q_r$.

At block 620, the anchor identifier identifies the topmost anchor point using edge estimation. It is often difficult for image analysis software to identify the topmost anchor point since many times it cannot be directly observed from the image, which is why edge estimation can be used. Within a small region around the left and right anchors, the anchor identifier locates the upper boundary points of the threshold image. The left upper boundary point 715 is shown in FIG. 7D (which is a zoomed in portion of the image 710 in FIG. 7C near the left anchor point $q_l$).

In one embodiment, the anchor identifier uses linear regression to estimate a boundary line for each anchor. FIG. 7E illustrates the boundary line 720 for the left anchor point $q_l$ that extends through the upper boundary point 715. A similar boundary line can be found for the upper boundary point for the right anchor point $q_r$.

The intersection of these boundary lines is the location of the top anchor point $q_t$. For example, FIG. 7F illustrates assigning the top anchor point $q_t$ at the intersection of the boundary line 720 for the left anchor point $q_l$ and the boundary line 725 for the right anchor point $q_r$. In one embodiment, the anchor identifier forces the X-axis of $q_t$ to the same as $q_o$ to avoid distortion in the transformation step performed at block 210 and 215 in the method 200.

Moreover, the isometric images may contain a foundation, which the game designer may wished to be removed (e.g., not be part of the sprite). At block 625, the anchor identifier removes the base or foundation of the image and adjusts the anchor points. To crop the foundation of an image, a similar edge detection algorithm as the one discussed above can be used to estimate the height of the foundation and remove it (e.g., by moving up the left, right, and bottom anchor points). The anchor points $q_i$ can then be used to perform the non-linear transformation discussed above in FIG. 2.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system comprising:

one or more processors; and one or more computer-readable storage media storing program instructions to cause the one or more processors to perform operations comprising:

identifying right, left, bottom, and top anchor points in an isometric image;

adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

2. The computing system of claim 1, wherein, after the adjusting the orientation of the isometric image using the cubic polynomial interpolation, the isometric image has a projection that matches dimensions of a grid of an isometric game.

3. The computing system of claim 2, wherein the isometric image is a sprite for the isometric game, wherein every sprite for the isometric game has a unified isometric orientation to match the grid of the isometric game.

4. The computing system of claim 1, wherein adjusting the orientation of the isometric image using the polynomial interpolation is performed before adjusting the orientation of the isometric image using the cubic polynomial interpolation.

5. The computing system of claim 1, wherein adjusting the orientation of the isometric image using the cubic polynomial interpolation comprises:

generating intermediate points between pairs of the anchor points, wherein the cubic polynomial interpolation is performed based on the intermediate points; and performing the cubic polynomial interpolation using boundary points to ensure that the isometric image around its boundary remains stationary.

6. A non-transitory computer readable medium comprising instructions which, when executed by a processor in a computing system, performs operations, the operations comprising:

identifying right, left, bottom, and top anchor points in an isometric image;

adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

7. The non-transitory computer readable medium of claim 6, wherein, after the adjusting the orientation of the isometric image using the cubic polynomial interpolation, the isometric image has a projection that matches dimensions of a grid of an isometric game.

8. The non-transitory computer readable medium of claim 7, wherein the isometric image is a sprite for the isometric game, wherein every sprite for the isometric game has a unified isometric orientation to match the grid of the isometric game.

9. The non-transitory computer readable medium of claim 6, wherein adjusting the orientation of the isometric image using the polynomial interpolation is performed before adjusting the orientation of the isometric image using the cubic polynomial interpolation.

10. The non-transitory computer readable medium of claim 6, wherein adjusting the orientation of the isometric image using the cubic polynomial interpolation comprises:

generating intermediate points between pairs of the anchor points, wherein the cubic polynomial interpolation is performed based on the intermediate points.

11. The non-transitory computer readable medium of claim 10, wherein adjusting the orientation of the isometric image using the cubic polynomial interpolation comprises:

performing the cubic polynomial interpolation using boundary points to ensure that the isometric image around its boundary remains stationary.

12. The non-transitory computer readable medium of claim 6, wherein identifying the right, left, bottom, and top anchor points comprises:

removing a background from the isometric image;

generating a two-color contrast image from the isometric image;

identifying the right, left, and bottom anchor points in the two-color contrast image; and identifying the top anchor point using edge estimation and the right, left, and bottom anchor points.

13. A method comprising:

identifying right, left, bottom, and top anchor points in an isometric image;

adjusting an orientation of the isometric image by shifting the right, left, bottom, and top anchor points in the horizontal direction using a polynomial interpolation; and adjusting the orientation of the isometric image by shifting the right, left, bottom, and top anchor points in the vertical direction using a cubic polynomial interpolation.

14. The method of claim 13, wherein, after the adjusting the orientation of the isometric image using the cubic polynomial interpolation, the isometric image has a projection that matches dimensions of a grid of an isometric game.

15. The method of claim 14, wherein the isometric image is a sprite for the isometric game, wherein every sprite for the isometric game has a unified isometric orientation to match the grid of the isometric game.

16. The method of claim 13, wherein adjusting the orientation of the isometric image using the polynomial interpolation is performed before adjusting the orientation of the isometric image using the cubic polynomial interpolation.

17. The method of claim 13, wherein adjusting the orientation of the isometric image using the cubic polynomial interpolation comprises:

generating intermediate points between pairs of the anchor points, wherein the cubic polynomial interpolation is performed based on the intermediate points.

18. The method of claim 17, wherein adjusting the orientation of the isometric image using the cubic polynomial interpolation comprises:

performing the cubic polynomial interpolation using boundary points to ensure that the isometric image around its boundary remains stationary.

19. The method of claim 13, wherein identifying the right, left, bottom, and top anchor points comprises:

removing a background from the isometric image;

generating a two-color contrast image from the isometric image;

identifying the right, left, and bottom anchor points in the two-color contrast image; and identifying the top anchor point using edge estimation and the right, left, and bottom anchor points.

20. The method of claim 19, further comprising:

removing a foundation in the isometric image which adjusts locations of the right, left, and bottom anchor points.

* * * * *